(12) United States Patent
Kim et al.

(10) Patent No.: US 9,193,342 B2
(45) Date of Patent: Nov. 24, 2015

(54) ELECTRONIC CONTROL BRAKE SYSTEM FOR VEHICLES

(71) Applicant: MANDO CORPORATION, Pyeongtaek-si (KR)

(72) Inventors: Hee Jun Kim, Seoul (KR); I Jin Yang, Seongnam-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 274 days.

(21) Appl. No.: 13/791,062

(22) Filed: Mar. 8, 2013

(65) Prior Publication Data

US 2013/0233656 A1   Sep. 12, 2013

(30) Foreign Application Priority Data

Mar. 8, 2012   (KR) .......................... 10-2012-0023700

(51) Int. Cl.
| | |
|---|---|
| *B60T 13/00* | (2006.01) |
| *B60T 13/14* | (2006.01) |
| *B60T 1/06* | (2006.01) |
| *B60T 13/68* | (2006.01) |
| *B60T 8/42* | (2006.01) |
| *B60T 8/48* | (2006.01) |

(52) U.S. Cl.
CPC ............... *B60T 13/147* (2013.01); *B60T 1/065* (2013.01); *B60T 8/4275* (2013.01); *B60T 8/4872* (2013.01); *B60T 13/686* (2013.01)

(58) Field of Classification Search
CPC ..... B60T 13/147; B60T 13/662; B60T 13/68; B60T 13/686; B60T 8/368; B60T 8/363; B60T 8/4872
USPC ........ 303/3, 11, 15, 157, 113.2, 115.4, 119.1, 303/20; 188/72.3
See application file for complete search history.

(56) References Cited

U.S. PATENT DOCUMENTS

| | | | | |
|---|---|---|---|---|
| 5,484,194 A | * | 1/1996 | Reinartz et al. ............ | 303/116.2 |
| 2003/0146659 A1 | * | 8/2003 | Cheong ...................... | 303/116.2 |

FOREIGN PATENT DOCUMENTS

| | | |
|---|---|---|
| KR | 10-1997-0021826 | 5/1997 |
| KR | 2007-0060467 | 6/2007 |
| KR | 2008-0043017 | 5/2008 |
| KR | 2011-0021580 | 3/2011 |

OTHER PUBLICATIONS

Office action dated Jul. 17, 2013 from corresponding Korean Patent Application No. 10-2012-0023700 and its English translation by Google Translate.

* cited by examiner

*Primary Examiner* — Robert A Siconolfi
*Assistant Examiner* — Vu Q Nguyen
(74) *Attorney, Agent, or Firm* — Ladas & Parry, LLP

(57) ABSTRACT

Disclosed is an electronic control brake system for vehicles which suppresses residual frictional force generated due to contact between pads and a disc. The electronic control brake system for vehicles includes a master cylinder, wheel brakes, each of which includes a caliper device including a disc and advancing and retracting a pair of pads pressing the disc to exhibit braking force by brake hydraulic pressure transmitted from the master cylinder, plural NO and NC type solenoid valves, low pressure accumulators, pumps and a motor pressurizing a fluid stored in the low pressure accumulators to discharge the fluid to the wheel brakes or the master cylinder, and a section between the plural solenoid valves and the low pressure accumulator is are formed as a closed circuit section, and the pump is driven to move a part of the fluid in the closed circuit section to the outlet of the pump.

4 Claims, 3 Drawing Sheets

ELECTRONIC CONTROL BRAKE SYSTEM FOR VEHICLES

CROSS-REFERENCE TO RELATED APPLICATION

This application claims the benefit of Korean Patent Application No. 2012-0023700, filed on Mar. 8, 2012 in the Korean Intellectual Property Office, the disclosure of which is incorporated herein in its entirety.

BACKGROUND

1. Field

Embodiments of the present invention relate to an electronic control brake system for vehicles which prevents residual frictional force generated between a disc and pads.

2. Description of the Related Art

In general, a vehicle is provided with a plurality of wheel brakes, each of which includes a caliper device including a disc and a pair of pads to brake a front wheel or a rear wheel to decelerate or stop the vehicle, a booster forming brake hydraulic pressure and transmitting the brake hydraulic pressure to the wheel brakes and a master cylinder, and thus, when a driver presses a brake pedal, the hydraulic pressure formed on the booster and the master cylinder is transmitted to pads of the wheel brakes, and the pads press the disc, thus generating braking force. However, when brake pressure is greater than a road surface state or frictional force of the wheel brakes generated by the brake pressure is greater than braking force generated from tires or a road surface while the driver presses the brake pedal to allow the vehicle to be in a braking force increasing state or a braking force maintaining state, slippage of the tires on the road surface occurs.

Recently, in order to effectively prevent such slippage to provide strong and stable braking force and to facilitate driving operation, brake systems, such as an anti-lock brake system (ABS) preventing slippage of wheels during braking, a traction control system (TCS) preventing excessive slippage of wheels during sudden start or sudden acceleration of a vehicle, and a vehicle dynamic control system stably maintaining the driving state of a vehicle by controlling a brake by combining an ABS and a TCS if the vehicle is not adjusted according to driver intention by force applied from the outside during high-speed driving of the vehicle, have been developed.

These conventional brake systems for vehicles include in common a modulator block (i.e., a hydraulic unit) including a plurality of solenoid valves, accumulators, a motor and pumps to control brake hydraulic pressure transmitted to wheel brakes, and an ECU to control electrically operated parts. The ECU senses a vehicle speed through respective wheel sensors disposed on front wheels and rear wheels, and thus controls operation of the respective solenoid valves, motor and pumps.

In the conventional brake systems, a disc of the wheel brake and a pair of pads pressing both sides of the disc may minutely come into contact due to partial abrasion without generation of brake pressure during driving. Contact between the disc and the pads generates residual frictional force and thus causes acceleration and driving loss.

SUMMARY

Therefore, it is an aspect of the present invention to provide an electronic control brake system for vehicles which suppresses residual frictional force generated due to contact between pads and a disc.

Additional aspects of the invention will be set forth in part in the description which follows and, in part, will be obvious from the description, or may be learned by practice of the invention.

In accordance with one aspect of the present invention, an electronic control brake system for vehicles includes a master cylinder forming brake hydraulic pressure according to operation of a brake pedal, wheel brakes, each of which includes a caliper device including a disc provided in a vehicle and advancing and retracting a pair of pads pressing the disc so as to exhibit braking force by the brake hydraulic pressure transmitted from the master cylinder, plural NO type solenoid valves and NC type solenoid valves respectively provided at the upstream sides and the downstream sides of the wheel brakes and controlling the flow of the brake hydraulic pressure, low pressure accumulators in which a fluid discharged from the wheel brakes is temporarily stored during pressure reduction braking of the solenoid valves, pumps and a motor pressurizing the fluid stored in the low pressure accumulators so as to discharge the fluid to the wheel brakes or the master cylinder, wherein a section between the plural solenoid valves and the low pressure accumulator is are formed as a closed circuit section to retract the pads from the disc, and the pump is driven to move a part of the fluid in the closed circuit section to the outlet of the pump.

The closed circuit section is formed by closing the NO type solenoid valves and opening the NC type solenoid valves.

The electronic control brake system for vehicles may further include NC type shuttle valves and TC solenoid valves for traction control and electronic control opening and closing valves between the low pressure accumulators and the pumps, and a section between the electronic control opening and closing valve and the NC type shuttle valve may be formed as a closed circuit section, and after the pump is driven to move a part of the fluid in the closed circuit section between the electronic control opening and closing valve and the NC type shuttle valve to the outlet of the pump, the electronic control opening and closing valve may be opened to move a part of the fluid in the closed circuit section between the plural solenoid valves and the low pressure accumulator.

The fluid in the closed circuit section between the electronic control opening and closing valve and the NC type shuttle valve may be moved to a section between the pump and the TC solenoid valve.

The fluid in the closed circuit section between the electronic control opening and closing valve and the NC type shuttle valve may be returned to the master cylinder.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
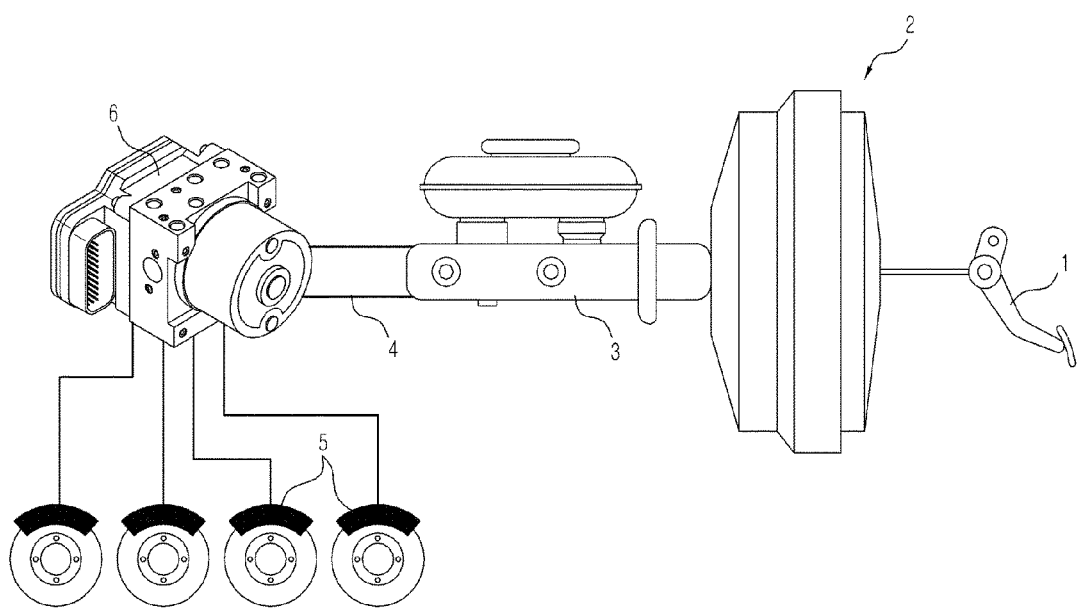
FIG. 1 is a view schematically illustrating an electronic control brake system for vehicles in accordance with one embodiment of the present invention.

Reference will now be made in detail to the embodiments of the present invention, examples of which are illustrated in the accompanying drawings, wherein like reference numerals refer to like elements throughout.

FIG. 1 is a view schematically illustrating an electronic control brake system for vehicles in accordance with one embodiment of the present invention. With reference to FIG. 1, the electronic control brake system for vehicles includes a brake pedal 1, a booster 2 amplifying foot effort on the brake pedal 1 and outputting the amplified foot effort, a master cylinder 3 converting pressure amplified by the booster 2 into hydraulic pressure, and a modulator block 6 connected to the master cylinder 3 by a hydraulic pipe 4 and controlling transmission of brake hydraulic pressure to respective wheel brakes 5. Although not illustrated in detail, the wheel brake 5 includes a caliper device including a disc installed on a wheel, pads located at both sides of the disc, and a piston advancing and retracting a cylinder to press the pads by brake hydraulic pressure.

Figure 2:
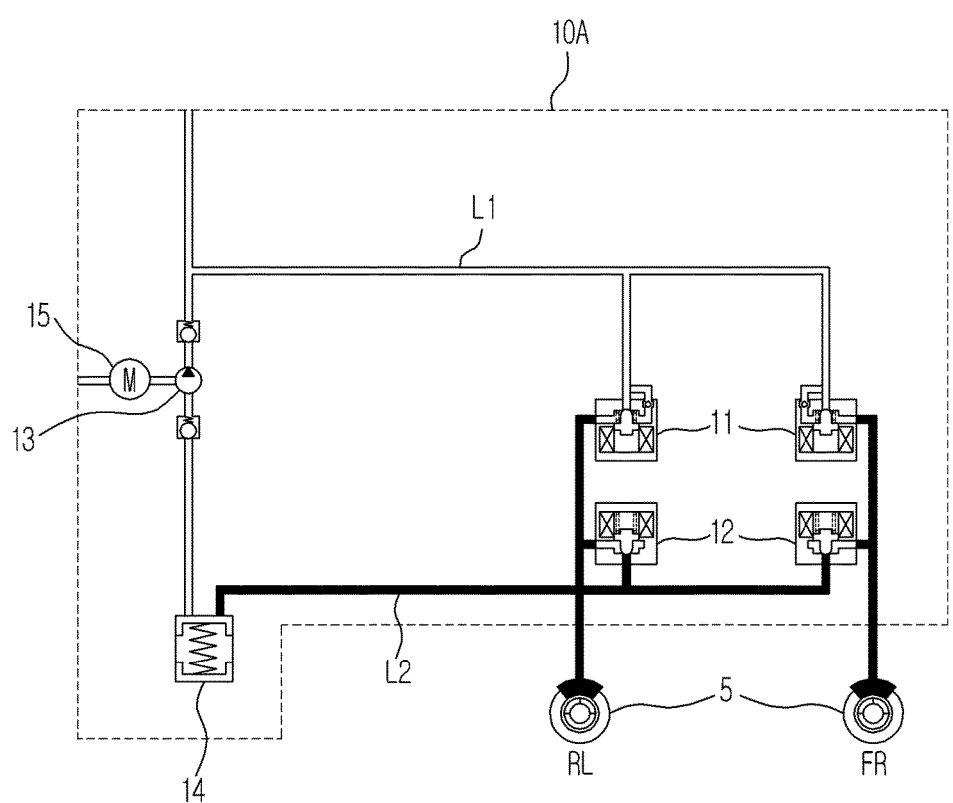
FIG. 2 is a hydraulic circuit diagram of an electronic control brake system for vehicles in accordance with one embodiment of the present invention illustrating a closed circuit section.

FIG. 2 is a hydraulic circuit diagram of an electronic control brake system for vehicles in accordance with this embodiment of the present invention. In this embodiment, an antilock brake system (ABS) will be exemplarily illustrated.

Generally, the master cylinder 3 includes two ports, i.e., a primary port and a secondary port, each of which respectively controls two wheel brakes of four wheel brakes, and each port is provided with a hydraulic circuit. Since the configuration of the secondary hydraulic circuit (not shown) is substantially the same as the configuration of the primary hydraulic circuit 10A, the primary hydraulic circuit 10A will be described hereinafter and a repetitive description of the secondary hydraulic circuit will be omitted. However, a pump 13 provided on the primary hydraulic circuit 10A and a pump (not shown) provided on the second hydraulic circuit 10B are driven together with a phase difference of 180 degrees by one motor 15.

As shown in FIG. 2, the primary hydraulic circuit 10A includes plural solenoid valves 11 and 12 to control brake hydraulic pressure transmitted to two wheel brakes 5 of a rear left wheel RL and a front right wheel FR, the pump 13 sucking and pumping a fluid (oil) discharged from the wheel brakes 5 or a fluid from the master cylinder 3, and a low pressure accumulator 14 temporarily storing the oil discharged from the wheel brakes 5.

The plural solenoid valves 11 and 12 are connected to the upstream sides and the downstream sides of the wheel brakes 5. The solenoid valves 11 disposed at the downstream sides of the respective wheel brakes 5 are normal open (NO) type solenoid valves which are maintained in an open state at normal times, and the solenoid valves 12 disposed at the upstream sides of the respective wheel brakes 5 are normal close (NC) type solenoid valves which are maintained in a closed state at normal times. The opening and closing operation of the solenoid valves 11 and 12 is controlled by an electronic control unit (ECU; not shown) sensing a vehicle speed through wheel sensors (not shown) disposed at the respective wheels. For example, during pressure reduction braking, the NO type solenoid valves 11 are closed, the NC type solenoid valves 12 are opened, and thus the fluid (oil) discharged from the wheel brakes 5 is temporarily stored in the low pressure accumulator 14.

The pump 13 is driven by the motor 15, sucks and discharges the fluid stored in the low pressure accumulator 14 (in an ABS pressure raising or pressure maintaining mode), and thus transmits fluid pressure to the wheel brakes 5 or the master cylinder 3.

Hereinafter, the function and effects of the above-described electronic control brake system for vehicles in accordance with this embodiment will be described.

When slippage occurs during braking of a vehicle provided with such an electronic control brake system, the ECU operates the ABS in three modes, i.e., pressure reducing, pressure raising and pressure maintaining modes, based on signals input from the respective wheel sensors. The respective control modes of the four wheels FR, FL, RR and RL are not controlled identically but, rather, are controlled individually according to road conditions and ABS control states. Now, the respective control modes will be described in stages through the primary hydraulic circuit 10A.

First, in a state in which a driver presses the brake pedal 1 and thus braking force is exhibited by fluid pressure generated by the master cylinder 3, when brake pressure of the wheel brakes 5 connected to the primary hydraulic circuit 10A is greater than a road condition (in the pressure reducing mode), the ECU executes an ABS pressure reducing mode by closing the NO type solenoid valves 11 and opening the NC type solenoid valves 12 so as to reduce the brake pressure to a proper pressure. Then, a part of fluid pressure (the fluid) is discharged from the wheel brakes 5 and is temporarily stored in the low pressure accumulator 14, and the braking force of the wheel brakes 5 mounted on the respective wheels is reduced and slippage of the vehicle on the road is prevented.

When the ABS reducing mode is continued for a long time, vehicle braking efficiency is lowered. Therefore, in order to increase fluid pressure of the wheel brakes 5, the ECU drives the motor 15, and thereby, an ABS raising mode is executed through fluid pressure discharged from the pump 13 of the primary hydraulic circuit 10A. That is, the fluid stored in the low pressure accumulator 14 is pressurized by the pump 13, and is transmitted to the wheel brakes 5 through the opened NO type solenoid valves 11, thereby increasing brake pressure. Here, fluid pressure discharged from the pump of the secondary hydraulic circuit is returned to the master cylinder 3 or is transmitted to the wheel brakes connected to the secondary hydraulic circuit according to brake pressure conditions.

If the brake pressure reaches a state generating the optimum braking force or the brake pressure needs to be maintained uniformly in order to prevent resonance of the vehicle, the ECU executes the ABS pressure maintaining mode. The ABS pressure maintaining mode eliminates fluctuation of pressure in the wheel brakes 5, and movement of hydraulic pressure is prevented by closing the NO type solenoid valves 11 of the primary hydraulic circuit 10A. Here, fluid pressure discharged from the pump 13 is transmitted to the master cylinder 3, and thus the ABS pressure maintaining mode is stably executed.

During driving of the vehicle in a constant mode, such as on cruise control, in order to raise driveability, the ECU executes an active brake-pad retraction system mode (hereinafter, referred to as an ABRS mode) to adjust an interval between the disc and the pads so as to prevent residual frictional force generated due to contact the disc and the pads in the non-braking state. That is, the ECU reduces fluid pressure of the piston pressing the pads by moving a part of the fluid in the hydraulic circuit of the wheel brakes 5 in the ABRS mode, and thus retracts the pads from the disc.

For example, in more detail with reference to FIG. 2, in order to execute the ABRS mode, the ECU drives the pump 13 using the motor 15 in a state in which the NO type solenoid valves 11 are closed and the NC type solenoid valves 12 are opened. The opening and closing states of the solenoid valves 11 and 12 in the ABRS mode are identical with those in the ABS operating modes, but the ABRS mode differs from the ABS operating modes in that the ABRS mode is executing during driving not braking.

When the ABRS mode is executed, movement of the fluid between a master cylinder side hydraulic circuit section L1 and a wheel brake side hydraulic circuit section L2 is cut off based on the closed NO type solenoid valves 11 and the low pressure accumulator 14. In FIG. 2, a dark color represents the wheel brake side closed circuit section L2, and the low pressure accumulator 14 maintains a pressure accumulation state when the pump 13 is not operated.

When the pump 13 is operated, a part of the fluid in the wheel brake side closed section L2 is sucked and returned to the master cylinder 3, and as a result, the hydraulic volume of the wheel brake side is reduced and the pads move away from the disc. The pads may be returned to their original positions, i.e., their normal braking positions, by adjusting a fluid displacement amount using a sensor sensing the pressure of the fluid.

Figure 3:
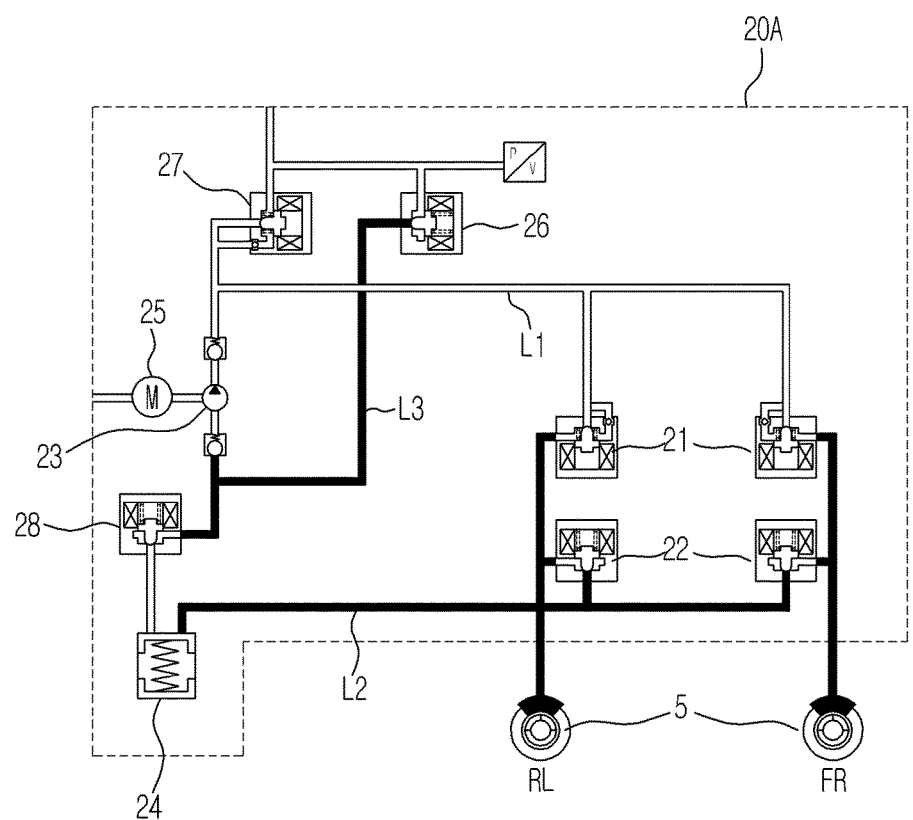
FIG. 3 is a hydraulic circuit diagram of an electronic control brake system for vehicles in accordance with another embodiment of the present invention illustrating closed circuit sections.

FIG. 3 is a hydraulic circuit diagram of an electronic control brake system for vehicles in accordance with another embodiment of the present invention. In this embodiment, a traction control system (TCS) among the electronic control brake systems for vehicles will be exemplarily illustrated. Since the configuration of a secondary hydraulic circuit (not shown) is substantially the same as the configuration of a primary hydraulic circuit 20A, the primary hydraulic circuit 20A will be described hereinafter and a repetitive description of the secondary hydraulic circuit will be omitted.

With reference to FIG. 3, the TCS further includes a separate oil suction path L3 guiding suction of the fluid (oil) of the master cylinder 3 to the inlet of the pump 13, in addition to the ABS. An NC type electric shuttle valve (ESV; hereinafter, referred to as an NC type shuttle valve) causing the fluid to flow only to the inlet of the pump 13 is provided on the oil suction path L3. The NC type shuttle valve 26 is closed at normal times and is opened in the TCS mode. Further, an NO type solenoid valve 27 for traction control (hereinafter, referred to as a TC solenoid valve) is provided on a main path (the L1 side) connecting the master cylinder 3 and the outlet of the pump 13. The TC solenoid valve 27 maintains an opened state at normal times and thus transmits brake pressure formed by the master cylinder 3 to the wheel brakes 5 during general braking through the brake pedal 1, and is closed by the ECU in the TCS mode. Further, a relief valve (not shown) is provided between the oil suction path and the main path.

In the above-described TCS, the ECU senses slippage, generated when a driver presses an acceleration pedal (not shown) deeply and thus the vehicle suddenly starts to drive on a slippery road, through wheel sensors. Then, the ECU opens the NC type shuttle valve 26 on the oil suction path L3, closes the TC solenoid valve 27 on the main path, and drives the motor 25 to cause the pump 23 to pump the fluid, thereby executing the TCS mode.

That is, when the TCS mode is executed, the fluid of the master cylinder 3 side is sucked to the inlet of the pump 13 through the oil suction path, and the fluid discharged to the outlet of the pump 13 is transmitted to the wheel brakes 5 through the main path and the opened CN type solenoid valves 21 and acts as brake pressure. Consequently, when the driver presses the acceleration pedal for sudden start, designated lock is applied to the wheels even if the driver does not press the brake pedal 1, and thus the vehicle slowly and stably starts even in slippery conditions, that is, under poor road conditions.

Further, the above-described ABRS mode may be executed in the TCS. For this purpose, as shown in FIG. 3, an electronic control opening and closing valve 28, such as a solenoid valve, is installed between the low pressure accumulator 24 and the oil suction path. As the electronic control opening and closing valve 28, an NC type valve is used so that the fluid does not flow backward to the low pressure accumulator 24 when the motor 25 pumps the fluid. Since both the electronic control opening and closing valve 28 and the shuttle valve 26 on the oil suction path are NC type valves, such a section L3 may be formed as a closed circuit section. The closed circuit section L3 is provided adjacent to the pump 23, and thus the ABRS mode may be more rapidly executed.

When the ABRS mode is executed, the ECU closes the NO type solenoid valves 21 and opens the NC type solenoid valves 22 of the wheel brake side. Then, movement of the fluid between a master cylinder side hydraulic circuit section L1 and a wheel brake side hydraulic circuit section L2 is cut off based on the closed NO type solenoid valves 21 and the low pressure accumulator 24. In FIG. 3, a dark color represents the wheel brake side closed circuit section L2.

When the pump 13 is operated, a part of the fluid in the closed circuit section L3 between the NC type electronic opening and closing valve 28 and the NC type shuttle valve 26 of the oil suction path is discharged to the outlet of the pump 23 and thus negative pressure is formed in the closed circuit section L3. Then, when the NC type electronic control opening and closing valve 28 is opened, the fluid of the wheel brake side closed circuit section L2 is sucked to the inlet of the pump 23, the hydraulic volume of the wheel brake side is reduced, and as a results, the pads retract so as to move away from the disc. The pads may be returned to their original positions, i.e., their normal braking positions, by adjusting a fluid displacement amount using a sensor sensing the pressure of the fluid.

The fluid discharged to the outlet of the pump 13 may be stored in the hydraulic circuit between the pump 13 and the NO type TC solenoid valve 27 by closing the NO type TC solenoid valve 27, or be returned to the master cylinder 3 by opening the NO type TC solenoid valve 27.

As is apparent from the above description, an electronic control brake system for vehicles which forms a closed circuit of a partial section of a wheel brake side of a hydraulic circuit, moves a fluid of the closed circuit section to the outside of the closed circuit section or moves the fluid of the wheel brake side closed circuit section to another closed circuit section, additionally prepared, by driving a motor and a pump, and thus reduces the hydraulic volume of the wheel brake side closed circuit section, thereby retracting pads (a piston) from a disc and effectively preventing residual frictional force generated due to contact between the disc and the pads.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic control brake system for vehicles comprising a master cylinder forming brake hydraulic pressure according to operation of a brake pedal, wheel brakes, each of which includes a caliper device including a disc provided in a vehicle and advancing and retracting a pair of pads pressing the disc so as to exhibit braking force by the brake hydraulic pressure transmitted from the master cylinder, plural NO solenoid valves and NC solenoid valves respectively provided at upstream sides and downstream sides of the wheel brakes and controlling the flow of the brake hydraulic pressure, low pressure accumulator in which a fluid discharged from the wheel brakes is temporarily stored during pressure reduction braking of the NO and NC solenoid valves, a pump, a motor pressurizing the fluid stored in the low pressure accumulator so as to discharge the fluid to the wheel brakes or the master cylinder, a NC shuttle valve and a TC solenoid valve for traction control, and an electronic control opening and closing valve between the low pressure accumulator and the pump, wherein a section between the plural NO and NC solenoid valves and the low pressure accumulator is formed as a closed circuit section to retract the pads from the disc, and the pump is driven to move a part of the fluid in the closed circuit section to an outlet of the pump, and wherein a section between the electronic control opening and closing valve and the NC shuttle valve is formed as a closed circuit section, and after the pump is driven to move a part of the fluid in the closed circuit section between the electronic control opening and closing valve and the NC shuttle valve to the outlet of the pump, the electronic control opening and closing valve is opened to move a part of the fluid in the closed circuit section between the plural NO and NC solenoid valves and the low pressure accumulator.

2. The electronic control brake system for vehicles according to claim 1, wherein the closed circuit section is formed by closing the NO solenoid valves and opening the NC solenoid valves.

3. The electronic control brake system for vehicles according to claim 1, wherein the fluid in the closed circuit section between the electronic control opening and closing valve and the NC shuttle valve is moved to a section between the pump and the TC solenoid valve.

4. The electronic control brake system for vehicles according to claim 1, wherein the fluid in the closed circuit section between the electronic control opening and closing valve and the NC shuttle valve is returned to the master cylinder.

\* \* \* \* \*